United States Patent Office 3,442,819
Patented May 6, 1969

3,442,819
MOLECULAR SIEVE COATED PARTICULATE ADSORBENT AND PROCESSES USING SAME
Victor Herbert, Great Neck, N.Y., assignor to Mount Sinai Hospital Research Foundation, Inc., New York, N.Y., a membership corporation of New York
Continuation-in-part of application Ser. No. 443,075, Mar. 26, 1965. This application Feb. 25, 1966, Ser. No. 530,175
Int. Cl. C01b 31/08
U.S. Cl. 252—428        8 Claims

ABSTRACT OF THE DISCLOSURE

This invention is directed to charcoal and other particulate adsorbents coated with molecular sieve compounds such as animal plasma, blood fractions, plasma expanders and other large molecular weight proteins to exclude large molecules and complexes while permitting small molecules and complexes to pass through the sieve and be adsorbed onto or desorbed from the particulate adsorbents, and to a process for separating dissolved molecular complexes, including molecules, having different molecular configurations.

---

This application is a continuation-in-part of my co-pending application, Ser. No. 443,075, filed Mar. 26, 1965, now abandoned.

This invention relates to new and useful improvements in charcoal and other particulate adsorbents coated with molecular sieve compounds and more particularly seeks to provide finely divided charcoal particles coated with animal plasma, blood fractions, plasma expanders and other large molecular weight proteins, carbohydrates or fats to form a molecular sieve of the coating on the solid microsponge of charcoal to exclude large molecules and complexes but will allow small molecules and complexes to pass through the sieve and be adsorbed onto or desorbed from the particles of charcoal.

Charcoal is well known for its adsorbing property for many materials and has many uses that take advantage of this property. However, since so many materials are adsorbed by the charcoal, it is generally not used to selectively adsorb one material from another where the molecules of the two materials do not vary widely in configuration, i.e. combination of weight, size and shape. Other compounds having similar adsorbing properties are activated clays (bentonite, kaolin), alumina base materials, magnesia base materials, bone char, silica gel, ion exchange resins, etc. Thus, although charcoal is the preferred adsorbent or microsponge, many others will be obvious and even more desirable for particular applications.

The molecular sieve or coating material can be any substance that will coat the adsorbent on a molecule thick basis which thus provides a molecular sieve layer. The selection of coating material permits the selective adsorption of one compound from another, i.e. generally molecules smaller than the coating molecules will pass through the sieve and be adsorbed, whereas the molecules as large or larger than the coating molecules will not pass through the sieve and will remain in the supernatant. Accordingly, the selection of coating material will be controlled primarily by the compounds to be separated as a proper coating can be found to separate most any two compounds. Depending upon the specific materials involved in coating and materials to be separated, a single compound, a complex, a fraction or group of similar compounds may be passed through the molecular sieve.

It is particularly desirable in biochemical assays to be able to separate free molecules from bound molecules, e.g. free $B_{12}$ from serum-bound $B_{12}$ or intrinsic factor-bound $B_{12}$, free thyroid hormone from serum-bound thyroid hormone, free iron from serum-bound iron, free insulin from insulin-bound to antibodies and molecules of varying molecular weights. Some of these examples with ionic charge have been separated with polyurethane sponge containing an effective ion exchange resin but this process is limited to charged particles, consumes several hours' time and is subject to deterioration of the sponge-ion exchange mixture.

It is an object of this invention to provide a product and process for separating by "instant dialysis" materials with some difference in molecular size, weight or shape, i.e. configuration.

It is a further object to provide such a product and process that will operate quickly, be useable to assay a wide range of materials, e.g. vitamins, minerals, hormones and other constituents of plasma, regardless of charge and with an economical, convenient and stable base that may be stored for long periods of time.

I have found that charcoal and other adsorbents when coated with animal (including human) plasma, blood fractions, recognized plasma expanders or substitutes, or other molecular sieve coatings, will selectively adsorb only some of the agents that would otherwise be adsorbed as apparently the coating acts as a molecular sieve over the microsponge of carbon to prevent certain molecules or complexes from reaching the carbon. This, of course, will be a function of the configuration of the coating molecules and may be tailored by the use of different coatings for a specific separation that may be desired. In fact, certain coating materials, e.g. gelatin, dextran, polyvinylpyrrolidone, etc. can themselves be adjusted as to molecular weight and thus as to their effectiveness as a sieve.

In addition, an agent adsorbed to coated charcoal may be desorbed in proportion to the relative forces of attraction for the charcoal and a particular desorbing medium. These forces of attraction may be affected by many physical and chemical factors, such as temperature, pH and ionic strength.

With the above objects and features in view, the nature of which will be more apparent, the invention will be more fully understood by reference to the accompanying detailed description and the appended claims.

Figure 1:
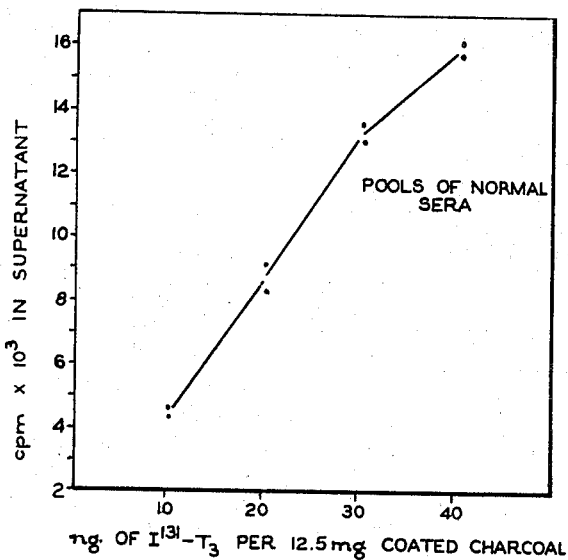
FIG. 1 is a graph showing the linear increase in desorption of $I^{131}$-$T_3$ by 0.5 ml. of two pools of normal sera as the ratio of $I^{131}$-$T_3$ to coated charcoal increases from 10 ng.:12.5 mg. to 40 ng.:12.5 mg.

from 0 to 120 minutes. The ratios shown in parentheses are similar to those plotted in FIG. 5.

This invention as illustrated in the following examples refers to albumin, dextran or hemoglobin coating of charcoal for certain assays but obviously the concept is applicable to many other adsorbents, coatings and assays which will be suggested to those skilled in the art.

Pharmaceutical grade "Norit A" charcoal from Amend Drug & Chemical Co., "Darco" grade "G-60" activated carbon from Atlas Chemical Industries and "Mallinckrodt 4394" activated "National Formulary" (NF) powder charcoal from Mallinckrodt Chemical Works have been used with equal success and without reactivation prior to use.

"Armour" Fraction V bovine serum albumin from Armour & Co., Fraction I bovine fibrinogen from Armour & Co. Fraction IV-1 alpha globulin from Nutritional Biochemical Corp. and Dextran 80 from Pharmacia, Inc. have been used to coat the various charcoals. Theoretically, the best coat is a molecule or complex most similar structurally to the molecule or complex to be excluded from the charcoal. The goal is to have a molecular sieve whose pores are sufficiently large to permit passage of one molecule but sufficiently small to exclude another molecule, e.g. a free molecule may be passed but excluded when it is combined with its carrier. For this reason, a mixture of alpha and beta globulin (saturated with non-radioactive $B_{12}$) would be preferable to coat the charcoal for assay of unsaturated $B_{12}$ binding capacity. However, results were excellent with bovine serum albumin, which is less expensive and more readily available. Hemoglobin is even less expensive and has been used in every example cited herein for albumin with excellent results. Other coating materials are beta and gamma globulin, gelatin, hemoglobin, sucrose polymer alcohol of 400,000 molecular weight ("Ficoll" from Pharmacia, Inc.), polyvinylpyrrolidone, etc.

An albumin-coated charcoal was prepared by mixing equal volumes of a 5% aqueous suspension of "Norit A" charcoal and a 1% aqueous solution of bovine serum albumin. This product may be stored in the refrigerator for weeks and used as needed. The charcoal adsorbed approximately 10% of its weight of bovine serum albumin. When $I^{131}$-labeled albumin was added to an equal weight of charcoal, the charcoal adsorbed and retained, after washing, 11.2% of its weight of albumin; an additional 2% was presumed to be trapped, since it was removed by 3 saline washes. To insure complete saturation of the charcoal, twice this quantity of albumin (10 mg.) was used per 50 mg. charcoal. The excess albumin in the supernatant had insignificant $B_{12}$ binding capacity. While suspensions of charcoal settle rapidly and are difficult to pipette and to remove from glassware, the albumin coating makes the charcoal settle much more slowly, pipette more easily, and become considerably less adherent. The same is true of dextran and other coatings.

Gastric juice (GJ) specimens were obtained from normal human (NHGJ) subjects and from patients with pernicious anemia (PAGJ). These specimens were depepsinized and stored at $-20°$ C. at pH 7. All gastric juices were assayed for intrinsic factor (IF) activity both by a micromodification of the dialysis method of Abels et al. and by the guinea pig gut homogenate assay system. The standard NHGJ used in testing unknown sera is from a large collection obtained from one subject.

Serum or plasma was obtained from normal adults, patients with various hematologic and non-hematologic disorders, and from patients with pernicious anemia with and without antibodies to IF. All specimens are stored at $-20°$ C. All sera were assayed for antibody activity as described under GJ. The standard antibody used in testing unknown GJ was obtained by plasmapheresis of a pernicious anemia patient with autoantibody to IF.

$Co^{57}$ and $Co^{60}$ labeled vitamin $B_{12}$ from Merck Sharp and Dohme Research Laboratories were used. The specific activity of the $Co^{57}B_{12}$ ranged from 4 to 11 $\mu c./\mu g.$ (microcurie/microgram) and that of the $Co^{60}B_{12}$ was approximately $1\mu c./\mu g.$ Each of these preparations registered approximately 1 count/min./pc. (picocurie) of activity in a scintillation counter.

EXAMPLE I

Assay of unsaturated $B_{12}$ binding capacity of gastric juice and of IF

Sequentially, to a 10 ml. test tube containing 0.9% saline, is added 0.1 ml. unknown gastric juice, and 0.1 ml. serum containing antibody to IF which are mixed well for 10 seconds. Then 7.5 ng. (nanogram) $Co^{60}B_{12}$ is added and the mixing repeated. After 10 seconds, there is no appreciable further uptake of $B_{12}$ by GJ or serum. 2 ml. of albumin-coated charcoal is then added and the contents are thoroughly mixed by thrice inverting the test tube which is then centrifuged. The uptake of free $B_{12}$ by albumin-coated charcoal is almost instantaneous, being complete within 10 seconds. The radioactivity of the supernatants or precipitates is compared with the controls (Table 1). The unsaturated $B_{12}$ binding capacity of 0.1 ml. of GJ is the number of ng. of $B_{12}$ in the supernatant and the IF content of the GJ is defined in terms of the number of ng. of $B_{12}$ by which antibody reduces the unsaturated $B_{12}$ binding capacity of the GJ. Results are expressed as "the unsaturated $B_{12}$ binding capacity of this GJ is $x$ pg. of $B_{12}$ per ml., of which $y$ pg. are due to IF." The supernatant control retains less than 1% of the added $Co^{60}B_{12}$.

TABLE 1

| GJ Number | $B_{12}$ pg. | Intrinsic Factor pg. | Percent |
|---|---|---|---|
| NH22 | 3,313 | 2,406 | 72.6 |
| NH30 | 6,303 | 1,309 | 20.8 |
| NH31 [1] | 6,576 | 6,343 | 96.5 |
| NH33 | 7,318 | 4,496 | 61.4 |
| PA2 | 1,030 | [2] 0 | |
| PA8 | 2,725 | 85 | [3] 3.1 |
| PA12 | 851 | [2] 0 | |
| PA28 | 987 | 36 | [3] 3.6 |

[1] Standard NHGJ.
[2] Values exceeded unsaturated $B_{12}$ binding capacity of GJ slightly, reflecting addition of standard plasma unsaturated $B_{12}$ binding capacity to unsaturated $B_{12}$ binding capacity of GJ.
[3] Repeat testing using 0.2 ml. of GJ resulted in only a 0.4% reduction in unsaturated $B_{12}$ binding capacity of GJ number 8 and 15.3% *increase* in unsaturated $B_{12}$ binding capacity of GJ number 28, demonstrating lack of IF in these two GJ specimens. These and similar studies demonstrated that reduction of less than 5% unsaturated $B^{12}$ binding capacity of 0.1 ml. of GJ by antibody may occur in GJ having no IF content.

Table 1 shows assays of unsaturated $B_{12}$ binding capacity and IF in the GJ of 4 normal subjects and 4 patients with pernicious anemia. False negative results have been found to occur if GJ contains a quantity of non-IF binder sufficient to bind most or all of the added radioactive $B_{12}$. This was previously found true in the dialysis assay. Thus, when the unsaturated $B_{12}$ binding capacity of the GJ is so great as to be close to or to exceed 7.5 ng. $B_{12}$ per 0.1 ml. GJ, the assay must be repeated using either less GJ or more radioactive $B_{12}$. When the IF content is low, the assay should be repeated with two or three times the quantity of GJ. As with all assays for IF using radioactive $B_{12}$ (including the Schilling test), that small fraction of IF which already is binding "cold" $B_{12}$ is probably not measured.

EXAMPLE II

Assay of antibody to IF in serum

Sequentially, to a 10 ml. test tube containing 0.9% saline are added 0.1 ml. standard NHGJ, 0.1 ml. unknown serum, 7.5 ng. $Co^{60}B_{12}$ and 2 ml. albumin-coated charcoal. The procedure is otherwise as described above for assay of IF in Example I. The antibody activity of serum is recorded in terms of the quantity of IF it prevents from binding $B_{12}$.

TABLE 2

| Number | $B_{12}$ pg. | Antibody Activity | |
|---|---|---|---|
| | | pg. | Percent |
| N146 | 6,263 | 1 0 | |
| N147 | 6,263 | 1 0 | |
| N148 | 6,263 | 1 0 | |
| PA21 | 6,263 | 468 | 2 7.5 |
| PA26 | 6,263 | 5,377 | 85.9 |
| PA35 | 6,263 | 5,917 | 94.5 |
| PA201A 3 | 6,263 | 5,908 | 94.3 |

1 Value exceeded unsaturated $B_{12}$ binding capacity of GJ slightly, reflecting addition of serum to unsaturated $B_{12}$ binding capacity of GJ.
2 Repeat testing using 0.2 ml. of serum number 21 resulted in a 24.4% decrease in unsaturated $B_{12}$ binding capacity of the standard GJ, demonstrating the presence of antibody in the serum.
3 Standard antibody (plasma).

Table 2 shows the assays of sera of 4 pernicious anemia patients with autoantibodies to IF, and 3 normal subjects. A false positive result for antibody will occur when the serum under study contains a large quantity of vitamin $B_{12}$ due to an injection of the vitamin within the prior 48 hours. Such false positives occur when the quantity of non-radioactive $B_{12}$ in the serum exceeds the $B_{12}$ binding capacity of the serum. In this situation, the excess "cold" $B_{12}$ dilutes the added radioactive $B_{12}$ and causes the apparent reduction in the unsaturated $B_{12}$ binding capacity of the NHGJ. When antibody activity is very weak, the assay should be repeated with two or more times the quantity of serum, as serum number 21. Note that the number of IF molecules blocked by antibody from binding $B_{12}$ is logarithmically rather than arithmetically increased as the antibody-antigen ratio improves. Of the first 18 sera from pernicious anemia patients which were studied using albumin-coated charcoal, 9 had antibody.

EXAMPLE III

Assay of unsaturated $B_{12}$ binding capacity of serum

Sequentially, to a 10 ml. test tube containing 0.9% saline are added 0.5 ml. unknown serum and 2.5 ng. $Co^{57}B_{12}$. The test serum and the $Co^{57}B_{12}$ are mixed for 10 seconds and then 2 ml. of albumin-coated charcoal are added. After centrifugation, the radioactivity of the supernatant is counted. The unsaturated $B_{12}$ binding capacity of serum is that quantity of $B_{12}$ prevented from adsorbing to charcoal by the serum.

TABLE 3

| Number | pg. $B_{12}$ unsat. | pg. $B_{12}$ total 1 | Percent sat. |
|---|---|---|---|
| N151 | 1,226 | 710 | 37 |
| N152 | 1,138 | 940 | 45 |
| N154 | 902 | 820 | 48 |
| M135 | 2,618 | 1,100 | 30 |
| M136 | 2,460 | 3,350 | 58 |
| M150 | 2 4,742 | 5,000 | 3 35 |

1 Microbiologic assay using *Euglena gracilis*.
2 Repeat testing with 5 ng. $Co^{57}B_{12}/0.5$ ml. serum resulted in unsaturated binding capacity of 9,274 pg./ml.
3 Based on unsaturated $B_{12}$ binding capacity of 9,274 pg./ml.

Table 3 shows the assays of serum unsaturated $B_{12}$ binding capacity in 3 normal subjects and 3 patients with myeloproliferative disorders. In instances of excessively high unsaturated $B_{12}$ binding capacity, as in serum number 150 of Table 3, this measurement must be made by either reducing the quantity of serum or increasing the quantity of radioactive $B_{12}$ in the assay protocol.

The method for assay of antibody is purely that of showing a serum inhibition of $B_{12}$ binding by gastric juice. Non-antibody inhibitors may exist and not all antibodies necessarily will block $B_{12}$ binding by IF and the term "antibody" is used herein with these reservations.

EXAMPLE IV

Assay for serum iron and serum unsaturated iron binding capacity (UIBC)

Serum was mixed with iron labeled with $Fe^{59}$ (5 μg. iron/ml. serum), in tris buffer at alkaline pH (charcoal releases iron at low pH), added to 2 ml. of 2.5% Norit A charcoal-0.125% hemoglobin, shaken 10 seconds, centrifuged, and quantity of $Fe^{59}$ in the supernatant counted. Results were similar to the UIBC determined by the Schade method.

Serum iron was determined by adding 1 ml. 0.25 N HCl to 1 ml. serum, since at pH below 5 the iron protein complex is dissociated. 5 μg. radioiron was added and the mixture neutralized with 1 ml. 0.25 N NaOH to allow chelation of iron by siderophilin, then added to 2 ml. hemoglobin-charcoal suspension at alkaline pH, shaken 10 seconds, centrifuged, and the amount of $Fe^{59}$ in the supernatant counted. Serum iron was calculated using the formula:

Serum Fe =
$$\frac{(c.p.m.\ supernatant)\ (\mu g.\ Fe\ added-UIBC)}{c.p.m.\ added-c.p.m.\ supernatant} - UIBC$$

The following table shows both serum iron and UIBC assays by the instant process and the Schade method:

TABLE 4

| | μg./100 ml. serum | |
|---|---|---|
| Number | Schade | Charcoal |
| 1 Fe | 300 | 320 |
| 2 Fe | 40 | 28 |
| 3 Fe | 140 | 140 |
| 4 Fe | 132 | 138 |
| 5 UIBC | 310 | 320 |
| 6 UIBC | 270 | 240 |
| 7 UIBC | 180 | 162 |

EXAMPLE V

Determination of ratio of free to bound triiodothyronine ($T_3$) in serum

This study evaluates ability of protein-coated charcoal to replace other agents in a $T_3$ uptake test, reflecting proportion of free to bound hormone in serum. 99% of 10 ng. of free $T_3$ is taken up by 50 mg. uncoated or albumin-coated Norit A and is not removed by 3 saline washes. In the resin-sponge test with $I^{131}-T_3$, hypothyroid sera gave ratios below 0.7 and hyperthyroid sera above 1.3, when compared to normal serum. When 10 ng. of $I^{131}-T_3$ was incubated in 0.5 ml. of these sera for 15 min. at 0° C., added to 50 mg. of Norit A plus 5 mg. albumin and centrifuged, the quantity of $I^{131}-T_3$ in the supernatants gave ratios almost identical to those in the resin-sponge test, but with higher percentages of $I^{131}-T_3$ in the counted material, and more reproducibility and accuracy. Thus, charcoal may be used to rapidly separate hypothyroid, euthyroid, and hyperthyroid subjects. $T_4$ may also be used, at room temperature, but does not separate the 3 groups as well as $T_3$. The following table compares resin sponge and albumin-charcoal results for $T_3$:

TABLE 5

| | $T_3$ Ratio | |
|---|---|---|
| Number | Sponge | Charcoal |
| 1 | 0.6 | 0.48 |
| 2 | 0.64 | 0.44 |
| 3 | 1.0 | 1.0 |
| 4 | 1.1 | 1.12 |
| 5 | 1.5 | 1.7 |

EXAMPLE VI

Radioimmunoassay for plasma insulin

A radioimmunoassay for plasma insulin was developed by Berson and Yalow employing radioisotope dilution and a fixed quantity of insulin-binding antibody, which requires 4 days of incubation at 4° C. apparently to permit stabilization of antigen-antibody complexes, and then paper hydrodynamic flow and/or chromatoelectrophoresis to separate free from antibody-bound insulin. By utilizing coated charcoal, the assay can be completed in less than 3 hours.

2 ml. of 2.5 gm. percent Norit A pharmaceutical grade charcoal coated with 0.25 gm. percent dextran 80 (Pharmacia, Inc.) adsorbs free insulin from albumin solutions within ten seconds, but rejects insulin-antibody complexes, which remain in the supernatant. Counting of the radioactivity in the supernatant after precipitation of the charcoal by centrifugation yields ratios of bound-to-free $I^{131}$-insulin, plotted against unlabelled insulin concentrations, which are essentially identical to those obtained by standard methods when the same antibody and $I^{131}$-insulin concentrations are employed.

The following table compares insulin assays by the Berson and Yalow method and with dextran-charcoal:

TABLE 6

| Number | Micro Units Insulin/ml. of Plasma | |
|---|---|---|
| | B & Y | Charcoal |
| 8 | 62 | 52 |
| 9 | 136 | 130 |
| 10 | 160 | 140 |
| 11 | 150 | 130 |
| 12 | 40 | 50 |
| 13 | 50 | 35 |
| 14 | 50 | 32 |

EXAMPLE VII

Growth hormone assay

This assay is identical to that reported above for insulin and the following table compares assays with the B & Y method:

TABLE 7.—GROWTH HORMONE

| Number | ng./ml. Serum | |
|---|---|---|
| | B & Y | Charcoal |
| 15 | 2.1 | 2.2 |
| 16 | 3.0 | 3.0 |
| 17 | 3.2 | 3.1 |

EXAMPLE VIII

Chorionic "Growth Hormone-Prolactin"

This assay is also identical to that reported above for insulin except that the results are compared with the previous assay method of Kaplan and Grumbach in the following table:

TABLE 8.—CHORIONIC "GROWTH HORMONE-PROLACTIN"

| Number | µg./ml. of Serum | |
|---|---|---|
| | K & G | Charcoal |
| 18 | 2.8 | 3.0 |
| 19 | 14.0 | 14.1 |
| 20 | 29.0 | 29.0 |

EXAMPLE IX

Vitamin $B_{12}$ assay

The principle of radioisotope dilution is applied by using the unknown quantity of nonradioactive $B_{12}$ released from serum to dilute the radioactivity of a known quantity of $Co^{57}B_{12}$. A solution of intrinsic factor concentrate (IFC) with a $B_{12}$ binding capacity less than the quantity of added $Co^{57}B_{12}$ is used to bind a portion of the mixture of radioactive and nonradioactive $B_{12}$, i.e. to "biopsy" the pool of $B_{12}$. The $B_{12}$ not bound to IFC is removed by addition of protein-coated charcoal. The quantity of radioactive $B_{12}$ bound to IFC is compared with the IFC control, and the $B_{12}$ level of the unknown serum is then obtained from a simple equation.

Norit "A" charcoal was coated with about 5% by weight of hemoglobin. $Co^{57}B_{12}$ having a specific activity of 4 to 11 µc./µg. was diluted with $H_2O$ to 1000 pg. $Co^{57}B_{12}$/ml. A stock solution of 0.9% saline of 10 µg. NFIF having a $B_{12}$ binding capacity of approximately 800 pg./ml. was prepared.

One ml. of unknown serum is added to 3 ml. 0.9% saline. The tubes for NFIF control and supernatant control contain 4 ml. saline. These are run in parallel to correct for volume changes caused by heating. To each tube 1 ml. 0.25 N hydrochloric acid is added. The tubes are capped with cotton wool, heated in a boiling water-bath for 15 minutes, and then cooled with tap water. One ml. standard $Co^{57}B_{12}$ is added to each tube and the contents are mixed for 10 seconds. One ml. NFIF is added to the unknown serum and NFIF control; an equal volume of saline is added to the supernatant control. The contents are mixed before and again after adding 2 ml. of hemoglobin coated charcoal. The tubes are centrifuged at 3,000 r.p.m. for 15 minutes, the supernatant fluid is decanted into counting tubes and the radioactivity in the supernatant fluid counted in a well-type scintillation counter.

The counts per minute (c.p.m.) for the supernatant control are subtracted from both those for the unknown and the NFIF control to obtain net counts. The serum $B_{12}$ level is calculated from the following formula:

pg. $B_{12}$ per ml. serum =
$$\frac{1000 \text{ (net c.p.m. of NFIF control)}}{\text{(net c.p.m. of unknown)}} - 1000$$

The quantity of $Co^{57}B_{12}$ used in the radio-dilution method determines its sensitivity within a particular range. To meet these requirements 1000 pg. $Co^{57}B_{12}$ is used in the method described. This quantity of $Co^{57}B_{12}$ exceeds the $B_{12}$ binding capacity of the NFIF by 20%, to ensure complete saturation of the $B_{12}$ binding sites on the intrinsic factor concentrate. For maximum accuracy in measuring $B_{12}$ levels between zero and 200 pg. per ml. the quantity of serum can be increased, or the amount of high specific activity $Co^{57}B_{12}$ decreased to 100 pg. with a proportional decrease of NFIF. Similarly, when assaying $B_{12}$ levels greater than 10,000 pg. per ml. the quantity of serum used can be decreased or the quantity of $Co^{57}B_{12}$ increased (the latter with a proportional increase of NFIF). The increased accuracy provided by such changes is unnecessary for diagnostic interpretation of serum $B_{12}$ levels.

The advantages of this assay over previously described radioisotopic methods and the classical bioassay procedure are greater simplicity, rapidity and reproducibility. The sensitivity range appears to extend from the lowest to the highest $B_{12}$ values of normal and pathological sera.

The results were compared with conventional $B_{12}$ assays by the Euglena procedure and are sufficiently similar to permit the same diagnostic interpretation. Values below 100 pg. per ml. were consistently lower in the charcoal assay. This may be due to the decreased sensitivity of the Euglena method in this range. Duplicate samples vary by as much as 200 pg. in the Euglena assay, but vary less than 30 pg. in the charcoal assay. The following table shows representative assays:

TABLE 9.—VITAMIN $B_{12}$

| Number | pg./ml. Serum | |
|---|---|---|
| | Euglena | Charcoal |
| 21 | 62 | 38 |
| 22 | 220 | 216 |
| 23 | 1,000 | 1,038 |

For Examples X to XV the procedures were as follows:

Coated charcoal was prepared by mixing equal volumes of a 5 gm. percent aqueous suspension of Norit A neutral pharmaceutical grade charcoal and 0.5 gm. percent aqueous solution of dextran or other desired molecule coat and stored at 5° C.

$I^{131}$-triiodothyronine, purchased in lots of 100 µc. from Abbott Laboratories, Chicago, Ill., was prepared as a stock solution of 100 ng. per ml. in isotonic saline-acetate-Veronal buffer, pH 7.4 (Michaelis buffer), containing 350 mg. percent normal human serum albumin (purchased as 5% U.S.P. Albumisol from Merck Sharp & Dohme) and stored at 5° C. Working solutions of the desired concentration, generally 20 ng. per ml., were prepared by diluting the stock solution in Michaelis-albumin buffer.

Coated charcoal impregnated with $I^{131}$–$T_3$ was prepared by adding 20 ng. (1 ml.) of $I^{131}$–$T_3$ solution for each 12.5 mg. (0.5 ml.) of coated charcoal suspension. This was mixed for a minute and then stored at 5° C.

To duplicate 7 ml. test tubes, 1.5 ml. of dextran coated-charcoal impregnated with $I^{131}$–$T_3$ (1.25 mg. dextran 10:12.5 mg. charcoal:20 ng. $I^{131}$–$T_3$) was added. The tubes were centrifuged at 3,000 r.p.m. for 10 minutes and the clear supernatant decanted, yielding a pellet of dextran 10-coated charcoal containing $I^{131}$–$T_3$. Washing the charcoal to remove "loosely adherent" or trapped $I^{131}$–$T_3$ was not necessary since only 0.2 to 0.3 percent of the radioactivity was removed from the charcoal by each wash. These pellets were stored at 5° C. until used.

0.5 ml. of test serum was added to each pellet of charcoal and the contents mixed thoroughly by thrice inverting the Parafilm-capped tubes, gently to avoid foaming (which suggests damage to protein). The tubes were then incubated at 37° C. for 30 minutes, and centrifuged at 3,000 r.p.m. for 10 minutes. The clear supernatant fluid, containing $I^{131}$–$T_3$ desorbed and bound to the serum proteins, was decanted into counting tubes, and radioactivity determined in a well-type scintillation detector.

Seven different types of charcoal were tested to determine if any one had particular properties which would offer advantages in the desorption of $I^{131}$–$T_3$ through a "molecular sieve." These charcoals varied in maximum particle size from $<44$ microns to $>1680$ microns; in surface area from 935 to 1400 m.$^2$ per gram; and in pH in water from 4.5 to 11.0. Norit A neutral pharmaceutical grade, U.S. sieve No. 270, maximum particle size 53$\mu$, surface area 935 m.$^2$ per gram, was found to function best when serum was used as the desorption medium.

EXAMPLE X

The amount of $I^{131}$–$T_3$ desorbed from coated charcoal by 0.5 ml. of normal serum was linearly related to the amount of the isotope per fixed quantity of charcoal. Thus, when the amount of $I^{131}$–$T_3$ bound to 12.5 mg. of coated-charcoal was increased from 10 to 40 ng., the amount removed by serum was proportionally increased as shown in FIG. 1.

EXAMPLE XI

Figure 2:
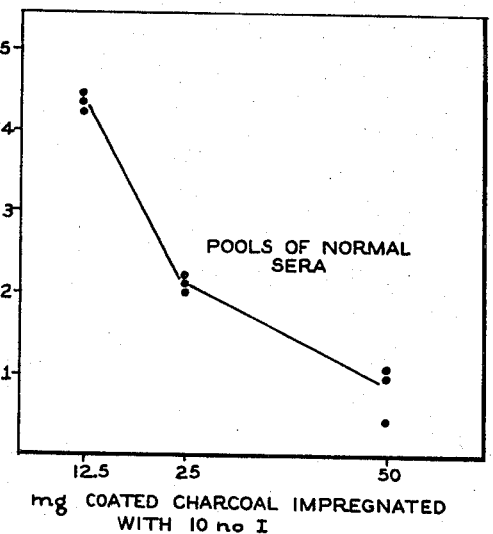
FIG. 2 is a graph showing the decreasing desorption of $I^{131}$-$T_3$ by 0.5 ml. of three pools of normal sera as the amount of coated charcoal used is increased from 12.5 to 50 mg. in accordance with this invention.

In the standard procedure, 20 ng. was chosen since it provided a suitable counting rate for 2 to 3 half-lives of $I^{131}$. Similarly, the amount of coated charcoal to be used was determined by decreasing the amount of charcoal from 50 to 12.5 mg. per fixed quantity (20 ng.) of $I^{131}$. The amount of $I^{131}$–$T_3$ removed by 0.5 ml. of serum increases with decreasing amounts of coated charcoal. Thus, 12.5 mg. of coated charcoal impregnated with 20 ng. of $I^{131}$–$T_3$ was found to yield the best desorption while providing a pellet of charcoal large enough to permit decanting of the supernatant fluid without washing away the pellet as shown in FIG. 2.

EXAMPLE XII

Figure 3:
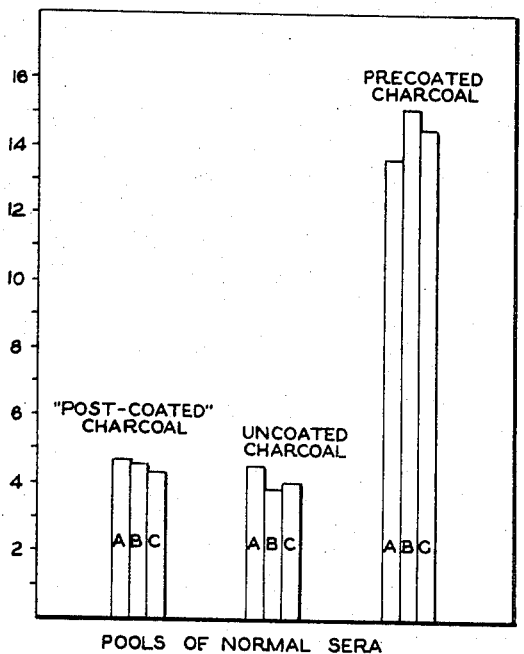
FIG. 3 is a graph showing the desorption of $I^{131}$-$T_3$ by 0.5 ml. of three pools of normal sera (labeled A, B, and C) is better when the hormone is added to precoated charcoal rather than post-coated or uncoated charcoal.

When $I^{131}$–$T_3$ was added to either uncoated charcoal or charcoal prior to the addition of a specific molecular coat (post-coated), desorption was less than when compared with $I^{131}$–$T_3$ added to precoated charcoal as shown in FIG. 3. In the case of uncoated charcoal, this may be because some of the serum $T_3$ binding proteins are adsorbed to the charcoal. In the case of charcoal coated after $T_3$ was added, this may be because a molecular coat added after $I^{131}$–$T_3$ layers over the $I^{131}$–$T_3$ and prevents the subsequent egress of the $T_3$. Precoated charcoal would allow free egress of subsequently added $I^{131}$–$T_3$, since none of the coat would be layered over the $I^{131}$–$T_3$.

EXAMPLE XIII

Figure 4:
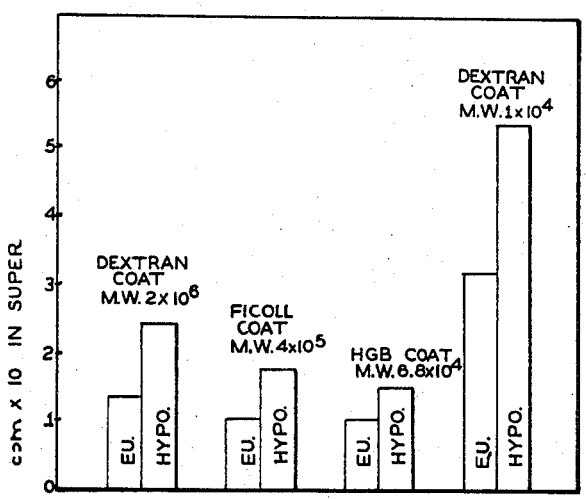
FIG. 4 is a graph showing the molecular size and configuration of the charcoal coat is important in facilitating egress of the radioiodinated hormone. While all four molecular coats separate the erythroid and hypothyroid groups, low molecular weight dextran allows the greatest desorption of the hormone, while preserving the differences expected in these two groups.

The specific molecular coat applied to the charcoal is of importance to the facility with which desorption takes place, probably because it is the only layer between the desorbing medium and the $I^{131}$–$T_3$. FIG. 4 shows the effect of 4 different coats: dextran average M.W. $2 \times 10^6$, Ficoll (a polymerized alcohol) average M.W. $4 \times 5^{10}$, human hemaglobin average M.W. $6.8 \times 10^4$ and dextran average M.W. $1 \times 10^4$. From the graph it is evident that low molecular weight (average M.W. $1 \times 10^4$) dextran when used as the coating agent permits excellent egress of $I^{131}$–$T_3$, with sufficient separation of euthyroid from hypothyroid sera to be of diagnostic value. Molecules of dextran are long and slender in configuration, those of hemoglobin are brick-shaped, and those of Ficoll are spheroid. It is envisioned that the molecular layering of dextran, average M.W. $1 \times 10^4$, best permits the forces of attraction of the serum to desorb $I^{131}$–$T_3$ from the charcoal. When low molecular weight dextran was used as the coating agent, approximately 15 percent of the $I^{131}$–$T_3$ in the charcoal was removed by normal serum.

EXAMPLE XIV

Figure 5:
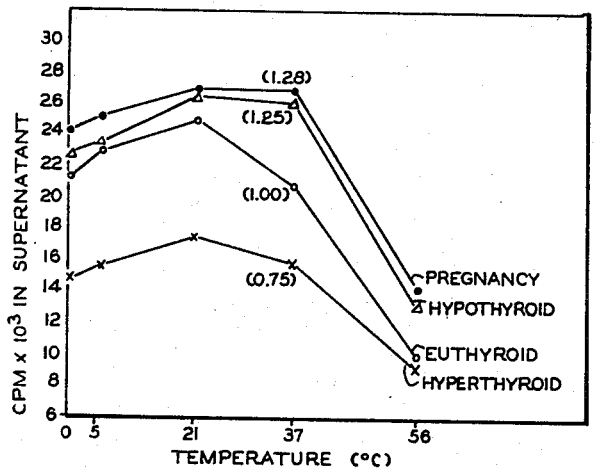
FIG. 5 is a graph showing the c.p.m. of the $I^{131}$-$T_3$ desorbed by 0.5 ml. of pregnant, hypothyroid, euthyroid and hyperthyroid pools of sera when incubated for 30 minutes at various temperatures. The figures in parentheses represent the ratios of the c.p.m. of the test sera compared to the c.p.m. of the euthyroid sera.

FIG. 5 shows the result of assaying degree of desorption of $I^{131}$–$T_3$ by 0.5 ml. of pools of sera from pregnant, hypothyroid, euthyroid and hyperthyroid subjects. The counts per minute in the supernatants of the four groups of sera are plotted against a temperature range from 0° C. to 56° C., with incubation for one-half hour. Separation of the various diagnostic groups of sera is best at 37° C., although separation of the hyperthyroid sera from the others is excellent over the range 0° C. to 37° C.

EXAMPLE XV

Figure 6:
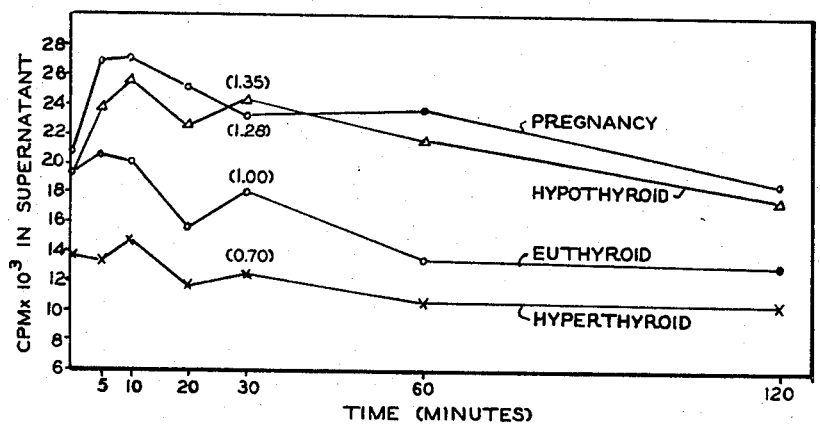
FIG. 6 is a graph showing the c.p.m. of the $I^{131}$-$T_3$ desorbed by 0.5 of pregnant, hypothyroid, euthyroid and hyperthyroid pools of sera when incubated at 37° C.

FIG. 6 shows the effect of length of incubation time on separation of the four diagnostic groups when the test is performed at 37° C. At 30 minutes there is sufficient differential desorption to separate diagnostic groups.

The methods of Examples X to XV depend on the relative affinity for $T_3$ of endogenous thyroid hormone binding proteins and the binder employed in the test, as well as on the selective ability of the binder to reject $T_3$ binding proteins. A wider application of the coated charcoal method here described is in the purification of various materials, based on their molecular size and configuration, using appropriately coated charcoal for batch separation, with subsequent desorption of the material from the coated charcoal. I have even used, sequentially, different coats, to make "fraction cuts" in accordance with molecular size of the agent we wished to isolate from a mixture.

Coated charcoal, by providing "instant dialysis," may prove useful in a wide range of procedures currently employing exhaustive dialysis or column chromatography to separate large from small molecules. The methods herein are sensitive, accurate, reproducible, and can generally be easily completed within an hour. The simplicity and ready availability of reagents and equipment lends them to ready adoption particularly in any clinical laboratory using radioisotopes.

The coating material is preferably within the range generally of 4 to 30% by weight of the charcoal but the important primary standard is saturation of the charcoal with the coating material, i.e. application of excess and optional washing out of all excess. The charcoal is preferably within a 10 to 100,000 A. pore size range and smaller mesh than size 10, 100 to 400 being preferred. The coating material preferably has a molecular weight of at least 10,000 up to 2 million. Charcoal as used herein is equivalent to activated carbon and is intended to include any adsorbent form of carbon.

It will be apparent that the coated charcoal selectively adsorbs and desorbs various materials from and to the supernatant solution and onto or from the coated charcoal which separation is the essential concept of this invention. Herein the separated materials are then quantitatively analyzed by tracer isotopes and scintillation counter. Obviously, many other quantitative or qualitative means could be used to analyze the separated components, such as colorimetry, gravimetric analysis, etc.

I claim:
1. A selective adsorbent microsponge formed by an adsorbent particulate charcoal base and a molecular sieve coating thereon having a molecular weight between 10,000 and 2,000,000 and selected from the group consisting of blood constituents, plasma substitutes, gelatin and a sucrose polymer alcohol whereby only selective molecules may pass through said sieve to be adsorbed by or desorbed from said base.

2. The microsponge of claim 1 wherein said coating is selected from the group consisting of albumin, alpha-, beta- and gamma-globulin, dextran, fibrinogen and hemoglobin.

3. The microsponge of claim 1 wherein said base is saturated with dextran as said coating.

4. The microsponge of claim 1 wherein said base is saturated with hemoglobin as said coating.

5. The microsponge of claim 1 wherein said base is saturated with albumin as said coating.

6. The microsponge of claim 5 wherein said coating compound is bovine albumin.

7. The microsponge of claim 1 wherein said charcoal has a pore size between 10 and 100,000 A. and a mesh size number greater than 10.

8. The microsponge of claim 7 wherein said mesh number is between 100 and 400.

References Cited

UNITED STATES PATENTS 1,744,735  1/1930  Berl _____ 252—426

PATRICK P. GARVIN, *Primary Examiner.*

U.S. Cl. X.R.

252—444; 260—112.7; 424—111, 178, 245